United States Patent
Boegner et al.

[11] Patent Number: 5,910,097
[45] Date of Patent: Jun. 8, 1999

[54] INTERNAL COMBUSTION ENGINE EXHAUST EMISSION CONTROL SYSTEM WITH ADSORBERS FOR NITROGEN OXIDES

[75] Inventors: Walter Boegner, Remseck; Karl-Ernst Haak, Lichtenwald; Bernd Krutzsch, Denkendorf, all of Germany; Wim Verrelst, Edegem, Belgium; Dirk Voigtlaender, Korntal, Germany; Guenter Wenninger, Stuttgart, Germany; Friedrich Wirbeleit, Esslingen, Germany

[73] Assignee: Daimler-Benz Aktiengesellschaft, Germany

[21] Appl. No.: 08/895,900

[22] Filed: Jul. 17, 1997

[30] Foreign Application Priority Data

Jul. 17, 1996 [DE] Germany .......................... 196 28 796

[51] Int. Cl.⁶ .................................................. F02M 25/06
[52] U.S. Cl. ................................. 60/278; 60/284; 60/286; 60/297; 60/301
[58] Field of Search ............................ 60/278, 284, 286, 60/288, 291, 297, 301

[56] References Cited

U.S. PATENT DOCUMENTS

| | | | |
|---|---|---|---|
| 5,085,049 | 2/1992 | Rim et al. ................................. | 60/274 |
| 5,365,734 | 11/1994 | Takeshima ................................ | 60/288 |
| 5,406,790 | 4/1995 | Hirota et al. ............................. | 60/286 |
| 5,457,958 | 10/1995 | Boegner et al. .......................... | 60/297 |

FOREIGN PATENT DOCUMENTS

| | | |
|---|---|---|
| 2 129 210 | 12/1972 | Germany . |
| 43 19 294 C1 | 5/1994 | Germany . |
| 57-171420 | 10/1982 | Japan . |
| 5-195756 | 8/1993 | Japan . |
| 07-171340 | 11/1995 | Japan . |
| 07-310533 | 11/1995 | Japan . |

*Primary Examiner*—Thomas E. Denion
*Attorney, Agent, or Firm*—Evenson, McKeown, Edwards & Lenahan, P.L.L.C.

[57] ABSTRACT

A motor vehicle exhaust emission control system has two adsorber parts connected in parallel for alternate adsorption and desorption of nitrogen oxides contained in the exhaust from an internal combustion engine and components for conducting further downstream the exhaust that emerges in the adsorber part that is operating at any given time in the adsorption mode and for returning the exhaust that emerges from the other adsorber part that is then operating in the desorption mode, to an intake line of the engine. An oxidizing converter is located upstream of the adsorber part and near the engine for oxidation of the NO contained in the exhaust to form $NO_2$, so as to permit an increase in the $NO_x$ adsorption rate for the nitrogen adsorber parts.

12 Claims, 2 Drawing Sheets

INTERNAL COMBUSTION ENGINE EXHAUST EMISSION CONTROL SYSTEM WITH ADSORBERS FOR NITROGEN OXIDES

BACKGROUND AND SUMMARY OF THE INVENTION

This application claims the priority of 196 28 796.0, the disclosure of which is expressly incorporated by reference herein.

The present invention relates to an exhaust emission control system with at least two nitrogen oxide adsorber parts alternately operated in adsorption and desorption modes, and apparatus for conducting further downstream, the exhaust stream emerging from the adsorber part that is currently operating in the adsorption mode. The adsorber part currently operated in the desorption mode recycles the emerging exhaust gas stream into an intake line of the engine.

A known emission control system is described in DE 43 19 294 C1. In one of the systems shown therein, the exhaust line runs from the exhaust outlet of the engine to a control valve that conducts the exhaust stream alternately into one of two exhaust line branches connected downstream. Each of the branches contains an adsorber for nitrogen oxides. Alternative systems are proposed containing only one adsorber for nitrogen oxides and a three-way catalytic converter. In a first such alternative version, the catalytic converter and adsorber are located in two parallel exhaust lines, and a cross line containing an associated control valve is provided between the two branches to connect the catalytic converter output with the adsorber input during adsorption operation. During desorption mode, the exhaust is scrubbed only by the catalytic converter. In a second alternative version the catalytic converter is located downstream from a connector where an exhaust line branch containing the adsorber for nitrogen oxides merges with a bypass line branch. To reinforce the desorption process, provision of a hot gas or inclusion of an electrically operated heating device is proposed.

An object of the present invention is to provide an exhaust emission control system with an exhaust scrubbing function that is further improved over the above-described known systems.

In an exhaust emission control system disclosed in JP 5-195756 (A) for an internal combustion engine, an oxidizing converter located near the engine oxidizes nitrogen oxides. In the flow direction of the exhaust downstream from the nitrogen oxide oxidizing converter, a jet injects a supplied reducing agent into the exhaust stream. Downstream from the jet there are then provided, in sequence, a nitrogen oxide converter and another oxidizing converter that oxidizes the hydrocarbons and carbon monoxide contained in the exhaust.

This object has been achieved by an exhaust emission control system in which oxidizing converter located near the engine and upstream from adsorber parts is provided for oxidation of at least the NO contained in the exhaust to $NO_2$ and an exhaust line section located upstream of adsorber parts is divided into a main line branch and a partial line branch that is parallel to the main line branch, shorter than the latter, and/or thermally insulated to a greater degree.

The two adsorber parts are connected by control valves to the main line branch and the partial line branch in such fashion that the adsorber part that is operating in the adsorption mode is fed by the exhaust stream from the main line branch and the other adsorber part that is operating in the desorption mode is supplied by the exhaust stream from the partial line branch or an oxidizing converter located near the engine and upstream from adsorber parts is provided for oxidation of at least the NO contained in the exhaust to $NO_2$.

The two adsorber parts are formed as integral parts of a cylindrical adsorber body through which the flow passes in the lengthwise direction, said body being divided into the two adsorber parts by at least one sector-dividing diaphragm located on the inlet side, with a relative rotary movement being provided around a rotational axis parallel to the flow direction between the sector-dividing diaphragm, provided at least on the inlet side, and the adsorber body.

In this new and advantageous system, an oxidizing converter is located downstream from the parts that adsorb nitrogen oxides near the engine, with the catalytic converter oxidizing the exhaust component NO to $NO_2$ comparatively soon following an engine start. Because many adsorber materials adsorb $NO_2$ much better than they absorb NO, higher $NO_x$ absorption rates can be achieved by adsorber parts connected downstream that adsorb nitrogen oxides. Also, the oxidizing converter can be used to oxidize other exhaust components such as carbon monoxide and hydrocarbons. Locating the adsorber parts that. adsorb nitrogen oxides as far away from the engine as possible is advantageous for achieving a low temperature level for $NO_x$ adsorption so that adsorption materials can be used that are not resistant to high exhaust temperatures, and hence to high desorption temperatures as well, or which have little or no ability to adsorb $NO_x$ at high temperatures.

In the exhaust emission control system according to one advantageous embodiment of the present invention, an exhaust line section located upstream from the adsorber parts is divided advantageously into a main flow line branch and a partial flow line branch. As a result of the shorter length and/or better thermal insulation of the partial flow line branch, its exhaust temperature at the outlet, and hence the temperature of the exhaust partial stream fed from this branch into the respective adsorber parts, is clearly above the corresponding temperature of the main exhaust stream guided through the main flow branch. Also, the colder exhaust main stream is fed to the respective adsorber part in the adsorption mode and the warmer exhaust partial stream is supplied during the desorption mode. Consequently, in the desorption mode the adsorber part is heated by the partial stream of exhaust so that the nitrogen oxides stored in it are desorbed and recycled into the intake line of the engine. Separate heating of the adsorber parts in the desorption mode is therefore not necessary at all or only to a slight degree, thus improving the energy balance of the system. As a result of the use of the partial exhaust stream, no additional stream of purge air is required for the desorption mode of the adsorber parts.

The oxidizing converter is favorably positioned inside an exhaust line section that is common to main line branch and partial line branch and is located upstream of both of them, or is located within an inlet area of main line branch. When the oxidizing converter is located within the main flow line branch, the hydrocarbons in the exhaust partial stream used for desorption of the nitrogen oxides the respective adsorber part are not oxidized. This can be utilized in the case of adsorption materials in which competing adsorption takes place between the hydrocarbons and the nitrogen oxides. The nitrogen oxides stored in the respective adsorber part in this case are more easily desorbed in the desorption mode because of the competing adsorption.

As an alternative configuring the two adsorber parts as separate absorber bodies, the other embodiment of the exhaust emission control system integrally combines them within a common absorber body. The body is in turn divided into the two adsorber parts by a suitable sector-dividing diaphragm located on the inlet side and preferably by a corresponding diaphragm on the outlet side. A relative rotary movement between the sector-dividing diaphragm provided at least on the inlet side and the adsorber body, with a rotational axis running parallel to the exhaust flow direction, allows each partial volume of the adsorber body to be in the sector range for the adsorption mode for an adjustable period of time and then in the sector area for the desorption mode.

According to another aspect of the present invention, desorption is supported by adding a desorption additive, so that effective desorption can take place even at comparatively low temperatures. As a desorption-promoting component, this additive contains at least hydrocarbons and possibly other components that can be obtained when used in a motor vehicle for example, from the fuel provided for the engine.

In a further system improvement according to the present invention, at least a part of the heat energy is supplied to the adsorber part operating in desorption mode by burning the fuel provided for the engine. The fuel is carried along in any event for use in, for example, a motor vehicle. In this connection, the burner is advantageously operated so that the hot gas produced has a desorption-promoting composition, i.e. it contains little or no oxygen, but unburned hydrocarbons.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
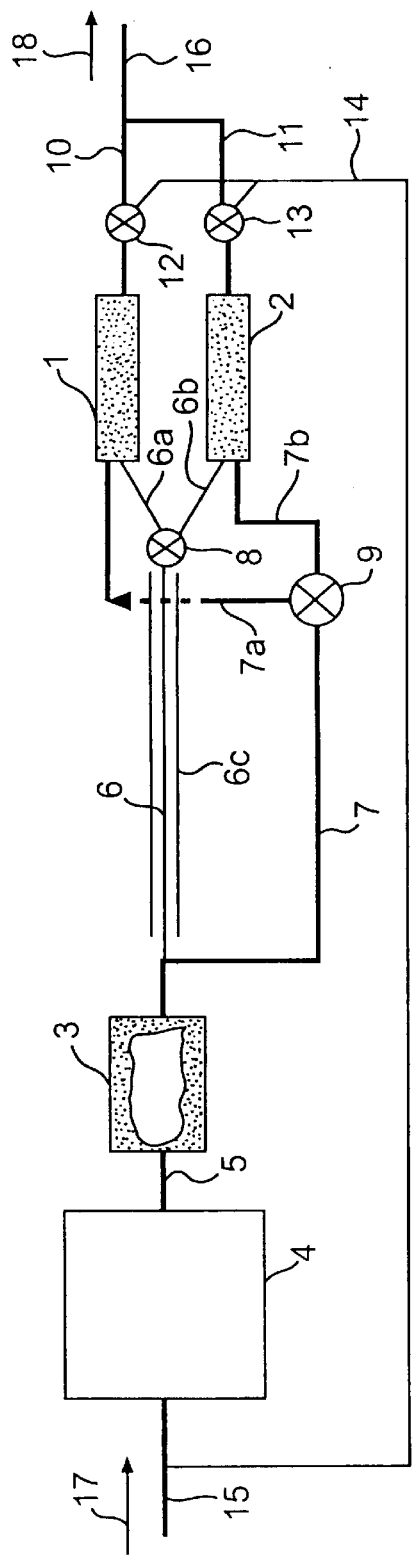
FIG. 1 is a block diagram of one embodiment of a motor vehicle exhaust emission control system according to the present invention.

The exhaust emission control system shown in FIG. 1 contains exhaust-scrubbing components which include two adsorber parts for nitrogen oxides in the form of two separate adsorbers 1, 2, and an oxidizing converter 3. The oxidizing converter 3 is located inside a section 5 of the exhaust line that extends away from the exhaust outlet of the corresponding exhaust-generating internal combustion engine, in this embodiment a motor vehicle engine 4, and is located as close as possible to the engine 4, while the other adsorbers 1, 2 are located as far as possible from the engine. Catalytic converter 3 oxidizes in particular the NO contained in the exhaust to form $NO_2$, but also converts CO to $CO_2$ and the hydrocarbons contained in the exhaust. By virtue of the positioning of oxidizing converter 3 near the engine, an effective oxidation reaction begins very soon after starting the engine 4. Downstream from the oxidizing converter 3, the exhaust line divides into a partial flow line branch 6 and a main flow line branch 7. The partial flow line branch 6 is given a length that is as short as possible and is effectively thermally insulated by a jacket 6c against the environment, while by contrast the main flow line branch 7 is configured as an elongated non-thermally-insulated line so that the exhaust temperature at the outlet of partial flow line branch 6 is significantly higher than that at the outlet of main flow line branch 7. For controllable guidance of the exhaust from partial flow line branch 6 or main flow line branch 7 to parallel adsorbers 1, 2 for nitrogen oxides, a control valve 8, 9 is provided at the downstream end of both the partial flow line branch 6 and the main flow line branch 7. A partial flow line 6a, 6b runs from partial flow line branch control valve 8 to the respective adsorber 1, 2, and similarly two main flow lines 7a, 7b running from main flow line branch control valve 9 to the respective adsorbers 1, 2.

From each of the two adsorbers 1, 2, a respective outlet line 10, 11 extends. A control valve 12, 13 is. provided in each of these two outlet lines 10, 11 for controllably introducing the exhaust stream emerging from the respective adsorber either into an exhaust line 16 that carries it further or into a return line 14 that terminates in an intake line 15 on the inlet side of the engine 4. Downstream from the two return line control valves 12, 13, the two outlet lines 10, 11 combine to form the common exhaust line 16 that carries them further.

In the combustion chambers of the engine 4 shown in FIG. 1, exhaust is generated by the burning of a fuel/air mixture 17. The exhaust travels from the combustion chambers into exhaust line section 5 and then into oxidizing converter 3 located near the engine 4. This catalytic converter 3 oxidizes the nitrogen monoxide, carbon monoxide, and hydrocarbons contained in the exhaust. From the oxidizing converter 3, a smaller portion of the exhaust is conducted through partial flow line branch 6 and a larger portion thereof is conducted through parallel main flow line branch 7, with the ratio of the two portions being determined by the ratio of the throughput cross sections of the two branches 6, 7. Alternatively, of course, the respective amounts of exhaust can be controlled by using valves, for example the two valves 8, 9 shown upstream from adsorbers 1, 2 or also additional valves.

Of the two parallel-mounted adsorbers 1, 2 for nitrogen oxides, one is always currently operated in the adsorption mode and the other always currently in the desorption mode. For this purpose, the two control valves 8, 9 upstream from adsorbers 1, 2 and the two control valves 12, 13 downstream from adsorbers 1, 2 are operated so that the adsorber that is currently operating in the adsorption mode receives the exhaust stream from main flow line branch 7 and the other adsorber that is currently operating in the desorption mode receives the exhaust stream from the partial flow line branch 6, and the completely scrubbed exhaust stream that emerges from the adsorber that is currently performing adsorption is fed to exhaust line 16 to conduct it further downstream.

The exhaust stream which emerges from the desorbing adsorber is fed into return line 14 and fed by the latter as a return flow 19 to intake line 15. The nitrogen oxides removed in the desorption mode in the respective adsorber is thus mixed with fuel mixture 17 to be burned in engine 4 and reacts as a result of the combustion process in engine 4 to form nitrogen and oxygen, while the exhaust that emerges from the adsorber operating in the absorption mode is expelled as a scrubbed exhaust stream 18 through an exhaust system.

Because the nitrogen monoxide contained in the exhaust has already been oxidized to form nitrogen dioxide in the oxidizing converter, a comparatively high $NO_x$ adsorption rate is achieved during operation of adsorbers 1, 2 in the adsorption mode. The exhaust component supplied to whichever adsorber is currently operating in the adsorption mode comes from main flow line branch 7 with its comparatively greater length and without thermal insulation, and therefore has already reached a relatively low temperature level when it enters the adsorber. Thereby, materials can easily be used in adsorbers 1, 2 which are not resistant to high exhaust temperatures and therefore to high desorption temperatures or have little or no $NO_x$ adsorption capacity at high temperatures.

If necessary, the exhaust temperature in main flow line branch 7 can be lowered by additional cooling measures such as providing cooling strips. In contrast, the temperature of the exhaust partial flow which comes out of partial flow line branch 6, which is configured with a comparatively short length and considerable thermal insulation, and is supplied to the adsorber operating in the desorption mode, is still comparatively high when it enters the adsorber in question, and in particular is much higher than the temperature of the exhaust main stream fed into the other adsorber which is in the adsorption mode. This causes heating of the adsorber which is currently in the desorption mode, so that the nitrogen oxides previously adsorbed therein are effectively desorbed. Additional heating of whichever adsorber is in currently the desorption mode is therefore not necessary, or is necessary only to achieve a relatively minor additional temperature increase, resulting in a favorable energy balance for the system. For the respective desorption mode which takes place alternately in one of the two adsorbers, no additional purge air stream is required that results from using the exhaust stream that comes from partial flow line branch 6.

Switching the operation of the two adsorbers 1, 2 from adsorption to desorption in one adsorber and conversely from desorption to adsorption in the other adsorber takes place when it is determined by conventional apparatus known to those skilled in the art, that the adsorber currently operating in the adsorption mode must be regenerated. For this purpose, the four valves 8, 9, 12, 13 are suitable operated so that the previously desorbing adsorber is supplied with the exhaust main stream instead of the exhaust partial stream and the other adsorber that was previously adsorbing receives the exhaust partial stream instead of the exhaust main stream, while at the same time the exhaust stream of the previously desorbing, and now currently adsorbing, adsorber is switched so that it goes to the exhaust and that from the adsorber which is now currently desorbing is fed to return line 19.

Figure 2:
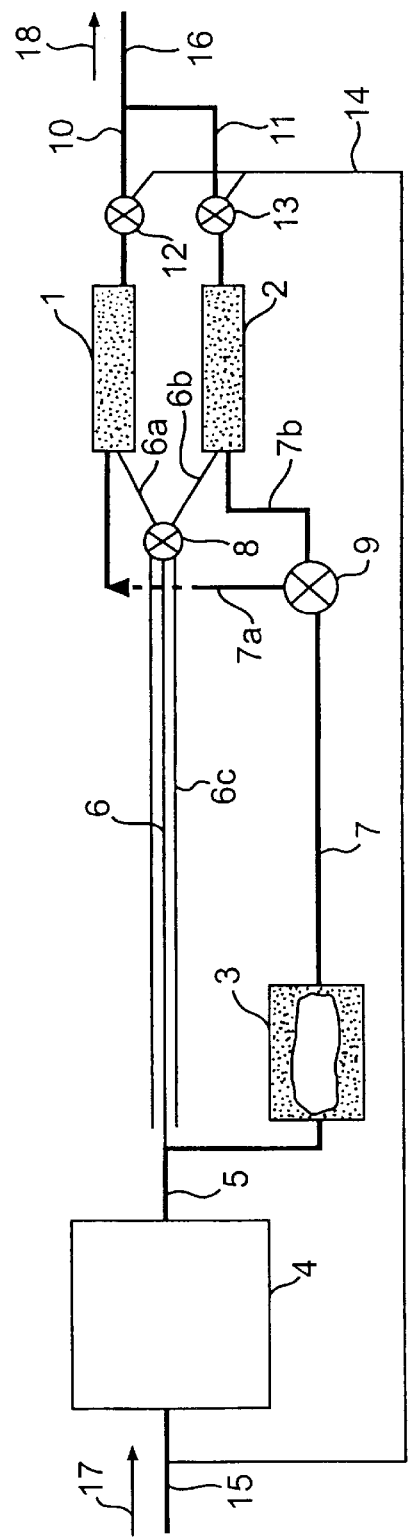
FIG. 2 is a block diagram of an exhaust emission control system similar to FIG. 1 but with modified positioning of an oxidizing converter.

In FIG. 2 a modified exhaust emission control system is shown that differs from that in FIG. 1 in the positioning of oxidizing converter 3, with functionally identical components being given the same reference numbers and with reference thereto being otherwise made to the description of the system in FIG. 1. In the system in FIG. 2, the oxidizing converter 3 is located within an inlet area of main flow line branch 7 and not in the common exhaust line section 5 that is located upstream from both partial flow line branch 6 and main flow line branch 7. Consequently, the exhaust stream conducted through partial flow line branch 6 does not flow first through oxidizing converter 3 and therefore contains among other things hydrocarbons that have not been oxidized as yet. This can be utilized to promote the desorption ability of the two nitrogen oxide adsorbers 1, 2, if adsorber materials are used in the latter in which a competing adsorption takes place between the nonoxidized hydrocarbons and the nitrogen oxides, i.e. a displacement adsorption. By leading this exhaust partial stream that contains the hydrocarbons out of partial flow line branch 6 into the adsorber currently operating in the desorption mode, the nitrogen oxides deposited in this adsorber can be readily desorbed by the competing adsorption of the hydrocarbons and then fed back in return flow 19 to engine intake line 15.

Desorption can also be promoted, especially in motor vehicles, by adding desorption additives that are obtained from the fuel which is carried along in any event for operating the internal combustion engine. Hydrocarbons, in particular, have a desorption-promoting effect of this kind, in that they influence the composition of the gas phase of the exhaust contained in the desorbing adsorber part, or influence the composition of the adsorber surface in such a way that effective desorption takes place even at a comparatively lower temperature. The first possibility that can be provided is to add the fuel directly into the adsorber part operating in desorption mode or into the partial flow line branch of the exhaust line that conducts the exhaust to the adsorber part currently operating in the desorption mode.

As an alternative to adding the fuel itself, a mixture of hydrocarbons and other reaction products produced by thermal or catalytic conversion of fuel aboard the vehicle can be added. This thermal or catalytic conversion of the fuel results in an improved effectiveness for desorption of nitrogen oxides than using the fuel itself. As yet another alternative, such a mixture can also contain hydrogen that likewise acts to promote desorption. The use of such desorption additives reduces the cost of the thermal insulation on the exhaust partial flow line branch in the desorption mode and of additional heating of the adsorber that is performing the desorption.

Another way of promoting desorption involves generating a hot gas by a burner which uses fuel from the fuel tank of the vehicle. The gas is supplied to the desorbing adsorber part directly or by adding it to the respective partial flow line branch. Thereby, an electrically operated heating device that would otherwise be necessary can be eliminated. Preferably, the burner is operated so that the generated hot gas contains little or no oxygen component but does contain residues of unburned hydrocarbons which then constitute a desorption additive which favors desorption of nitrogen oxides in addition to raising the temperature.

Preferably the hot gas and/or the other desorption additives mentioned, after passing through the desorbing adsorber part, are conducted together with the desorbed nitrogen oxides into the intake air of the engine. During subsequent combustion, the nitrogen oxides are converted into nitrogen and oxygen and the other gas mixture components are transformed primarily into carbon dioxide and water. The desorption and recycling of the desorption gases to be burned in the engine is preferably conducted under high engine load, and in a four-cycle engine additionally preferably during operation under stoichiometric or rich operating conditions.

Advantageously, a metering device is provided for adding the fuel or the mixture containing hydrocarbons obtained from the fuel. The device is operated by the engine control. Of course, the addition of such desorption additives can be combined with electrical heating of the desorbing adsorber part. This heating device, when desorption additives are used, can be operated at lower power because effective desorption takes place at lower temperatures when this is done.

Figure 3:
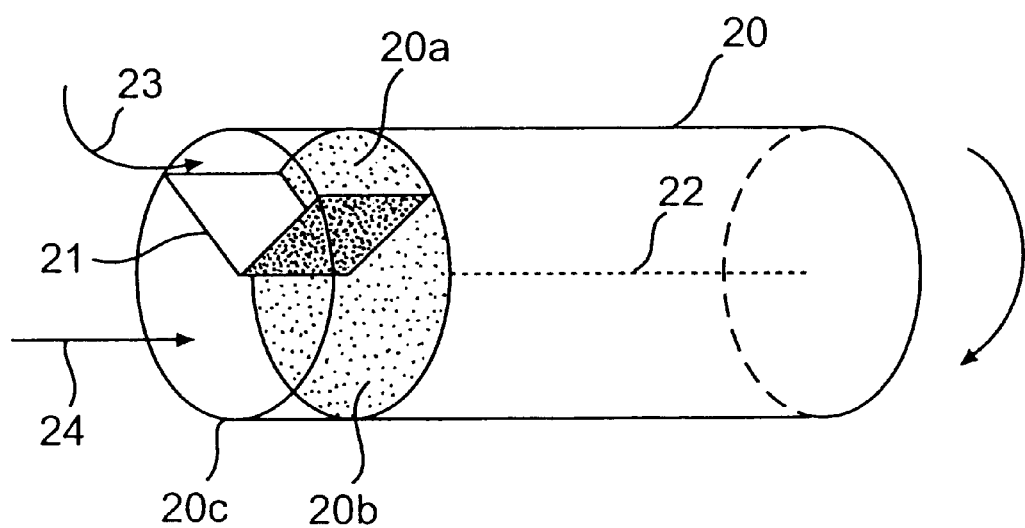
FIG. 3 is a schematic perspective view of an adsorber body with two integral adsorber parts for an exhaust emission control system of a motor vehicle.

FIG. 3 shows a variation on the adsorber for nitrogen oxides used in FIGS. 1 and 2. Of the two adsorber parts 20a, 20b, one 20a is operated in the desorption mode at any one time and the other 20*b* is operated in the adsorption mode. The two absorber parts 20*a*, 20*b* are formed integrally by a common cylindrical adsorber body 20 is mounted to rotate around its lengthwise axis 22 running parallel to the exhaust flow direction. At the end which faces the exhaust inlet, the adsorber body 20 terminates in an inlet sleeve 20*c* which receives a sector-dividing diaphragm 21 dividing the circular end face of the adsorber body 20 on the inlet side into a desorption sector and a larger adsorption sector. The desorbing exhaust flow component 23 is conducted into the desorption sector while the exhaust flow component 24 for adsorber operation is fed to the adsorption sector. The two exhaust flow components 23, 24 then flow essentially separately from one another through the desorbing and adsorbing adsorber parts 20*a*, 20*b*.

In order to ensure that each partial volume of adsorber body 20 is periodically operated in the adsorption and desorption modes, adsorber body 20 is caused to rotate around its lengthwise axis 22 relative to fixed sector-division diaphragm 21 so that each adsorber body's partial volume, depending on the rotational speed and the sector angle of sector-dividing-diaphragm 21, is alternately associated for a first time interval with the adsorbing adsorber part 20*b* and for a second interval with the desorbing adsorber part 20*a*.

Preferably a sector-dividing diaphragm is also provided on the face of adsorber body 20 on the outlet side, with that diaphragm corresponding in its dimensions to the inlet side diaphragm 21. Then the sector-dividing diaphragm on the outlet side is rotated relative to the one on the inlet side 21 through a rotational angle that corresponds to the rotational angle traversed by exhaust 23, 24 flowing through adsorber body 20 as a result of the rotation of adsorber body 20. As a result, the exhaust partial stream 23 containing the nitrogen oxides released by desorption and the exhaust partial stream 24 freed of the adsorbed nitrogen oxides can deliberately be conducted separately out of adsorber body 20. This takes into account the fact that the two integral adsorber parts 20*a*, 20*b* constitute partial volumes of adsorber body 20 which are produced by the sectors that twist helically and axially through adsorber body 20 and are defined on the inlet side by the sector-dividing diaphragm 21. This integral implementation of the two adsorber parts 20*a*, 20*b* has the advantage over the adsorbers in FIGS. 1 and 2 in that two separate adsorber bodies are not required and, further, no valve-controlled exhaust supply to the adsorber parts is required.

Of course, in addition to the two examples given, other embodiments of the invention are within the contemplation of the present invention. For example exhaust emission control systems with more than two adsorber parts for nitrogen oxides mounted in parallel and a functionally-correct modified division of the exhaust feed line located near the engine upstream of these adsorber parts and containing one or more oxidizing converters utilize the above-described inventive concepts.

What is claimed is:

1. Exhaust emission control system for an internal combustion engine, comprising:
    two adsorber parts arranged in parallel for alternate adsorption and desorption of nitrogen oxides contained in exhaust from an engine, and
    means for conducting further downstream the exhaust emerging from one of the two adsorber parts currently operated in the adsorption mode and for recycling the exhaust emerging from the other of the two adsorber parts operating in the desorption mode, into an intake line of the engine,
    an oxidizing converter located proximate the engine and upstream from the adsorber parts for oxidation of at least NO contained in the exhaust to $NO_2$, and
    an exhaust line section located upstream of the adsorber parts divided into a main line branch and a partial line branch parallel to the main line branch, and at least one of shorter than the main line branch and thermally insulated to a greater degree, wherein the two adsorber parts are connected by control valves to the main line branch and the partial line branch such that the one adsorber part that is operating in the adsorption mode is fed by the exhaust stream from the main line branch and the other adsorber part that is operating in the desorption mode is supplied by the exhaust stream from the partial line branch.

2. The exhaust emission control system according to claim 1, wherein the oxidizing converter is located inside an exhaust line section common to the main line branch and the partial line branch and is located one of upstream thereof, or within an inlet area of the main line branch.

3. The exhaust emission control system according to claim 1, wherein a desorption additive containing a hydrocarbon is added to the adsorber part currently operating in the desorption mode, said additive optionally containing at least one of hydrogen and reaction products produced by thermal or catalytic conversion of the fuel used for the internal combustion engine.

4. The exhaust emission control system according to claim 3, wherein the oxidizing converter is located inside an exhaust line section common to the main line branch and the partial line branch and is located one of upstream thereof, or within an inlet area of the main line branch.

5. The exhaust emission control system according to claim 1, wherein a hot gas is supplied to the adsorber part currently operating in the desorption mode, said hot gas being produced in a burner by combustion of the fuel for the internal combustion engine such that said hot gas contains an oxygen component which is as small as possible and a minimum residual content of unburned hydrocarbons.

6. The exhaust emission control system according to claim 5, wherein the oxidizing converter is located inside an exhaust line section common to the main line branch and the partial line branch and is located one of upstream thereof, or within an inlet area of the main line branch.

7. The exhaust emission control system according to claim 6, wherein a desorption additive containing a hydrocarbon is added to the adsorber part currently operating in the desorption mode, said additive optionally containing at least one of hydrogen and reaction products produced by thermal or catalytic conversion of the fuel used for the internal combustion engine.

8. The exhaust emission control system for an internal combustion engine, comprising
    two adsorber parts arranged in parallel for alternate adsorption and desorption of nitrogen oxides contained in exhaust from the engine and
    means for conducting further downstream, the exhaust emerging from one of the adsorber parts currently operating in the adsorption mode and for recycling the exhaust emerging from the other of the adsorber parts currently operating in the desorption mode into an intake line of the engine,
    an oxidizing converter located proximate the engine and upstream from the adsorber parts for oxidation of at least NO contained in the exhaust to $NO_2$, and
    the two adsorber parts comprised from a cylindrical adsorber body through which flow passes in a lengthwise direction of the cylindrical adsorber body, said body being divided into the two adsorber parts by at least one sector-dividing diaphragm located on at least the inlet side, with a relative rotary movement being provided around a rotational axis parallel to the flow direction between the sector-dividing diaphragm and the adsorber body.

9. The exhaust emission control system according to claim 8, wherein a desorption additive containing a hydrocarbon is added to the adsorber part currently operating in the desorption mode, said additive optionally containing at least one of hydrogen and reaction products produced by thermal or catalytic conversion of the fuel used for the internal combustion engine.

10. The exhaust emission control system according to claim 8, wherein a hot gas is supplied to the adsorber part currently operating in the desorption mode, said hot gas being produced in a burner by combustion of the fuel for the internal combustion engine such that said hot gas contains an oxygen component which is as small as possible and a minimum residual content of unburned hydrocarbons.

11. The exhaust emission control system according to claim 10, wherein the oxidizing converter is located inside an exhaust line section common to the main line branch and the partial line branch and is located one of upstream thereof, or within an inlet area of the main line branch.

12. The exhaust emission control system according to claim 11, wherein a desorption additive containing a hydrocarbon is added to the adsorber part currently operating in the desorption mode, said additive optionally containing at least one of hydrogen and reaction products produced by thermal or catalytic conversion of the fuel used for the internal combustion engine.

* * * * *